(12) United States Patent
Ryu

(10) Patent No.: US 6,958,993 B2
(45) Date of Patent: Oct. 25, 2005

(54) RADIO DATA COMMUNICATION SYSTEM AND METHOD THEREOF

(75) Inventor: Deug-Hyeon Ryu, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 865 days.

(21) Appl. No.: 09/825,895

(22) Filed: Apr. 5, 2001

(65) Prior Publication Data

US 2001/0046224 A1 Nov. 29, 2001

(30) Foreign Application Priority Data

May 24, 2000 (KR) ........................................ 2000/28158

(51) Int. Cl.⁷ ............................................ H04L 12/66
(52) U.S. Cl. ...................... 370/352; 370/356; 370/338
(58) Field of Search ................................. 370/351–356, 370/310, 342, 335, 320, 338, 389, 363, 395.7, 395.71, 412–413, 428–429; 709/213, 219, 227, 228, 238; 710/13, 22–23, 308

(56) References Cited

U.S. PATENT DOCUMENTS

| | | | | |
|---|---|---|---|---|
| 5,889,770 A | * | 3/1999 | Jokiaho et al. | 370/337 |
| 5,896,369 A | * | 4/1999 | Warsta et al. | 370/338 |
| 5,903,851 A | * | 5/1999 | Backstrom et al. | 455/557 |
| 5,973,640 A | * | 10/1999 | Lee | 342/357.1 |
| 6,009,327 A | * | 12/1999 | Park | 455/439 |
| 6,084,542 A | * | 7/2000 | Wright et al. | 342/357.13 |
| 6,466,547 B1 | * | 10/2002 | Lim et al. | 370/241 |
| 6,671,287 B1 | * | 12/2003 | Huttunen et al. | 370/469 |

* cited by examiner

Primary Examiner—Ajit Patel
Assistant Examiner—Chirag Shah
(74) Attorney, Agent, or Firm—Robert E. Bushnell, Esq.

(57) ABSTRACT

A radio data communication system includes a router and LAN (Local Area Network) switch connected to an IP (Internet Protocol) network. A private BTS (base station Transceiver Subsystem) exchanges data with a mobile terminal, and a private IP exchange performs switching between mobile terminals. A call manager manages a call, and a private BSC (base Station Controller) provides a mobile subscriber with a complete path and assigns a vocoder in response to a request for an incoming or outgoing call to process the incoming or outgoing call . An Internet interface (Internet interface) connected between a high capacity IPC (Inter-Processor Communication) node board assembly (HINA) in the private BSC and a LAN cable, communicates with the private BTS under the control of the call manager, transmits packet data received from the radio terminal to the IP network, monitors installation or uninstallation and functional errors of the private IP exchange, and transmits the monitoring results to a wire system manager in the call manager through an Ethernet port.

8 Claims, 4 Drawing Sheets

RADIO DATA COMMUNICATION SYSTEM AND METHOD THEREOF

CLAIM OF PRIORITY

This application makes reference to, incorporates the same herein, and claims all benefits accruing under 35 U.S.C § 119 from an application entitled Radio Data Communication System and Method Thereof filed in the Korean Industrial Property Office on May 24, 2000, and there duly assigned Serial No. 2000-28158 by that Office.

BACKGROUND OF THE INVENTION

1. Field of the Invention

The present invention relates generally to a radio data communication system, and in particular, to a radio data communication system which provides a data service to a radio terminal by connecting a public land mobile network to a local area network (LAN) connected to the public switched telephone network (PSTN), and a method thereof.

2. Description of the Related Art

A code division multiple access (CDMA) radio data communication system may include, a public land mobile network (PLMN) comprised of a mobile switching center, a base station controller and a base station transceiver subsystem, and an interworking function (IWF) for data service with an Internet protocol (IP) network. In order for a mobile terminal to receive the data service, the base station transceiver subsystem receives radio data transmitted from the mobile terminal and transmits the received radio data to the base station controller.

The base station controller then transmits the received data to the interworking function through the mobile switching center. The interworking function is connected to the IP network to provide the data service. When the mobile terminal receives radio data, the procedure is performed in reverse order. The interworking function, interconnected between the mobile switching center and the IP network, has an interfacing function for the additional data service and performs adaptation functions for data transmission among an iDEN (Integrated Dispatch Enhanced Network), a PSTN, an ISDN (Integrated Services Digital Network) and a packet network.

In particular, the interworking function provides a data service for a radio mobile station, has a rate adaptation function between "64 Kbps PCM (pulse code modulated) data" and "compressed data" of an air interface, has a data modem function for a public phone, and also has a G3 FAXMODEM (Facsimile-Modem) function. Although the interworking function is necessary for the radio data service, it includes four or more separate boards, increasing the overall hardware complexity.

Incorporated by reference herein are: U.S. Pat. No. 5,889,770 to Timo Jokiaho et al. entitled Local Updating For A Packet Switched Data Service In A Mobile Communication System which discusses packet data transfer modes between a mobile station and a special data service center. The packet service center produces an interworking function between the cellular radio network and a separate data network. Data packets are transmitted between a mobile station capable of data transmission and the packet service unit by using a so-called virtual connection. In this case, 1) a circuit-switched connection through the cellular network is only established for the period of time required for transmitting a single packet, or 2) packets are transferred through the cellular radio network on the basis of the address on a data packet according to the node-to-node scheme entirely without a circuit-switched connection by using the network elements of the cellular network as nodes; U.S. Pat. No. 5,903,851 to martin Bäckström et al. entitled Radio Link Short Hold Mode For Mobile Circuit Data Applications which discusses a communication link between a mobile switching center and an external network which is enabled using a connection with an interworking unit that enables data to be transferred between the differing communication protocols of the external network and the public land mobile network including the base station, mobile switching center and mobile station; U.S. Pat. No. 5,896,369 to Markus Warsta et al. entitled Mobile Communication System And A Method For Connecting A Remote Workstation To A Data Communication Network Via A Mobile Communication Network which describes using a special interconnecting computer in conjunction with a mobile exchange to allow a remote workstation to be connected over a radio path for extending the connection to a designation data network; and U.S. Pat. No. 5,973,640 to Keun-Ju Lee entitled Method And Device For Managing Status/Alarm Message of GPS Receiver And Broadcast System Time utilizing a High Capacity IPC Node Board Assembly (HINA).

SUMMARY OF THE INVENTION

It is, therefore, an object of the present invention to provide a radio data communication system and method for enabling radio data communication of the same function without the interworking function.

It is another object of the present invention to provide a radio data communication system and method for decreasing the hardware complexity by controlling a data service for a radio mobile station in a base station controller.

To achieve the above and other objects, there is provided a radio data communication system which includes a router and LAN (Local Area Network) switch connected to an IP (Internet Protocol) network. A private BTS (base-station Transceiver Subsystem) exchanges data with a mobile terminal, and a private IP exchange performs switching between mobile terminals. A call manager manages a call, and a private BSC (Base Station Controller) provides a mobile subscriber with a complete path and assigns a vocoder (voice coding and decoding) in response to a request for an incoming or outgoing call to process the incoming or outgoing call. An Internet interface (INIA (1P Network Interface board Assembly module)) connected between a high capacity IPC (Inter-ProcessorCommunication) node board assembly (HINA) in the private base station controller and a LAN cable, communicates with the private BTS under the control of the call manager, transmits packet data received from the radio terminal to the IP network, monitors installation or uninstallation and functional errors of the private IP exchange, and transmits the monitoring results to a wire system manager (not shown) in the call manager through an Ethernet port (not shown).

The Internet interface included in the private base station controller receives program data for the data transmission process of the mobile terminal from the call manager, and stores alarm information by checking installation or uninstallation of the peripheral boards and the link state. Further, the Internet interface receives data from the mobile terminal through a U-link, processes the received data according to the program loaded from the call manager and transmits the processed data to the IP network through the Ethernet interface and the LAN cable. The alarm information is also transmitted to the call manager through the Ethernet interface and the LAN cable. Having the Internet interface, the private base station controller can serve as the interworking function, contributing to a decrease in the hardware complexity.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
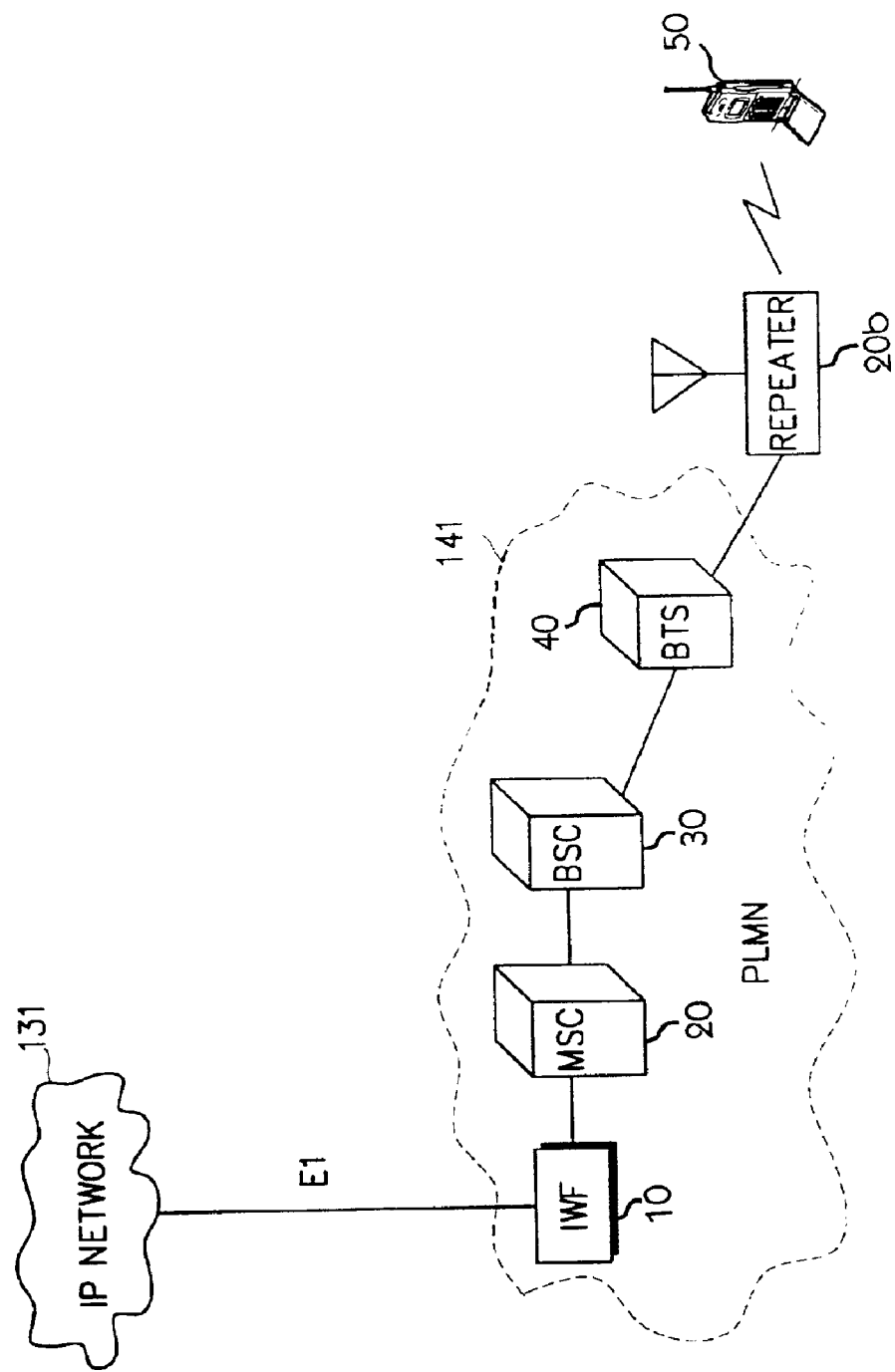
FIG. 1 is a diagram for explaining an exemplary radio data communication service.

In a CDMA radio data communication system shown in FIG. 1, a public land mobile network (PLMN) 141 is comprised of a mobile switching center (MSC) 20, a base station controller (BSC) 30 and a base station transceiver subsystem (BTS) 40, and independently includes an interworking function (IWF) 10 for a data service with an Internet protocol (IP) network 131.

In FIG. 1, in order for a mobile terminal 50 to receive the data service, the base station transceiver subsystem 40 receives radio data transmitted from the mobile terminal 50 and transmits the received radio data to the base station controller 30. The base station controller 30 then transmits the received data to the interworking function 10 through the mobile switching center 20.

The interworking function 10 is connected to the IP network 131 to provide the data service. When the mobile terminal 50 receives radio data, the procedure is performed in reverse order. The interworking function 10, interconnected between the mobile switching center 20 and the IP network 131, has an interfacing function for the additional data service and performs adaptation functions for data transmission among IDEN, PSTN, ISDN and a packet network.

In particular, the interworking function 10 provides a data service for a radio mobile station, has a rate adaptation function between "64 Kbps PCM (pulse code modulated) data" and "compressed data" of an air interface, has a data modem function for a public phone, and also has a G3 FAXMODEM (Facsimile-Modem) function. Although the interworking function 10 is necessary for the radio data service, it includes four or more separate boards, increasing the overall hardware complexity.

Figure 2:
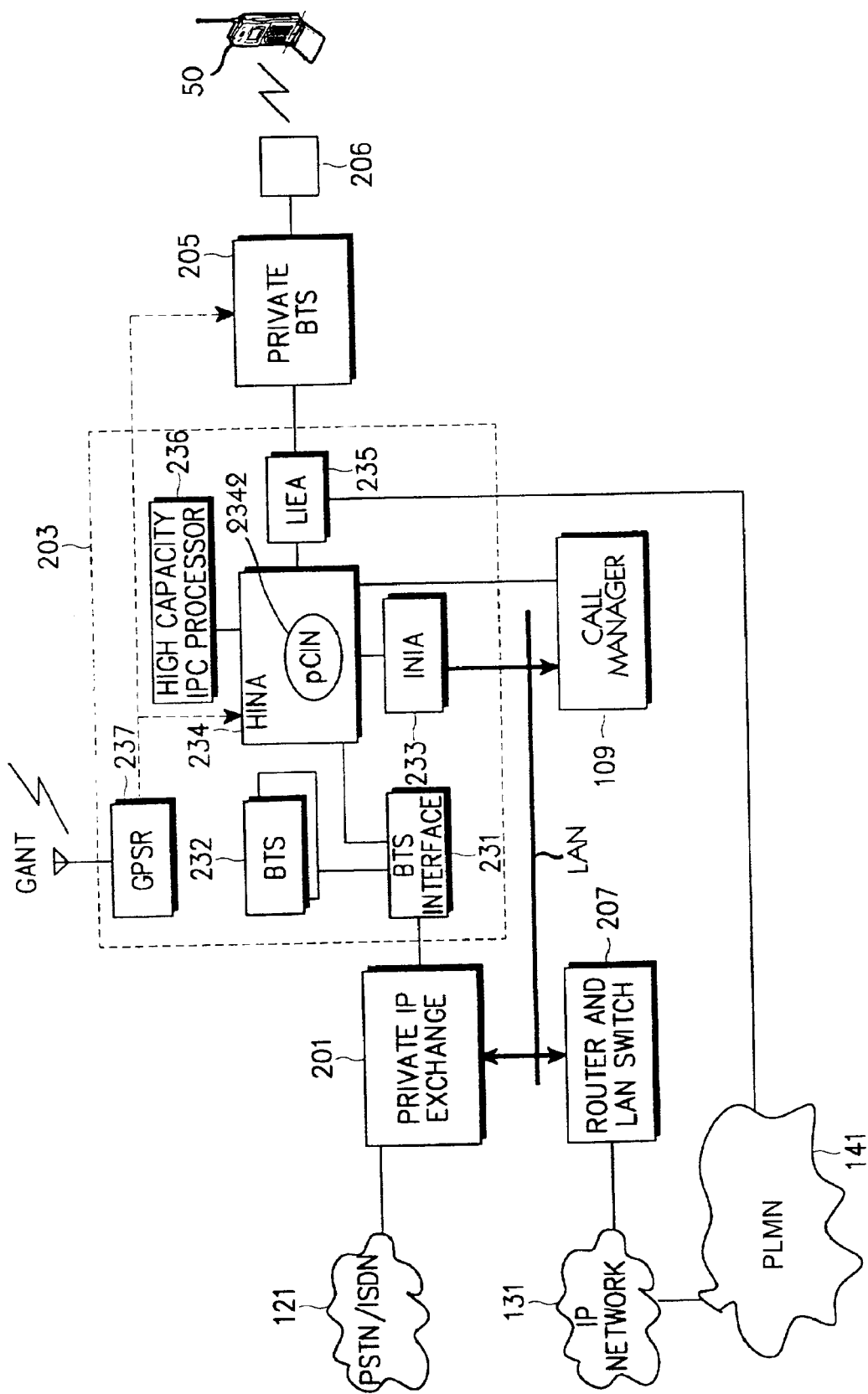
FIG. 2 is a diagram illustrating a network structure for the radio data communication service according to an embodiment of the present invention.

FIG. 2 illustrates a network structure for a radio data communication service according to an embodiment of the present invention.

Referring to FIG. 2, the radio data communication system includes a router and LAN switch 207 connected to the IP network 131. A private base station transceiver subsystem 205 exchanges data with a mobile terminal 50 via repeater 206, and a private IP exchange 201 performs switching between mobile terminals 50. A call manager 109 manages a call, and a private base station controller 203 provides a mobile subscriber with a complete path and assigns a vocoder (vocoder) in response to a request for an incoming or outgoing call to process the incoming or outgoing call.

The radio data communication system includes an Internet interface (INIA) 233, a call manager 109, a high capacity IPC (Inter-Processor Communication) node board assembly (HINA) 234 including a private communication interconnection network (PCIN) 2342 which provides a communication path between HINA 234 and Internet interface 233, a link interface IPOC EI board assembly (LIEA) 235 providing an interface between public land mobile network (PLMN) 141 and HINA 234 by an unchannelized El (2.04 Mbps) method as a repeater line interfacing device; a high capacity IPC (Inter-ProcessorCommunication) processor (HIPA) 236 and a local area network cable LAN. The HINA 234 performs all interface functions of a base station controller and thus a communication between all boards is performed via HINA 234. Further, HIPA 236 plays a role of a main CPU for controlling all boards of the base station controller.

The Internet interface 233 included in the private base station controller 203 communicates with the private base station transceiver subsystem 205 under the control of the call manager 109, transmits packet data received from the radio terminal 50, via repeater 206, to the IP network 131, monitors installation (a state that a peripheral board is normally operated) or uninstallation (a state that there is no peripheral board or the peripheral board is abnormally operated) and functional errors of the private IP exchange 201, and transmits the monitoring results to a wire system manager in the call manager 109 through an Ethernet port. Examples of peripheral boards are:

a Samsung power unit (SPU-P)
a global positioning system receiver (GPSR)
a high capacity IPC processor board assembly (HIPA)
a high capacity IPC node board assembly (HINA)
a local interface E1 board assembly (LIEA)
transcoder and selector assembly (TASA)
a TSB interface E1 board assembly (TIEA)

The other parts: base station transceiver subsystem interface 231; base station transceiver subsystem 232; and global positioning satellite receiver 237 are not pertinent to the invention and will not described herein. These parts are disclosed in Korean patent application No. 2000-28087, filed by the same applicant. Therefore, the detailed description will be avoided.

The Internet interface 233 included in the private base station controller 203 receives program data for the data transmission process of the mobile terminal from the call manager 109, and stores alarm information (information to be transmitted to a call manager for the display of the existence and non-existence of an error via a monitor of the call manager for viewer monitoring) by checking installation or uninstallation of the peripheral boards and the link state.

Further, the Internet interface 233 receives data from the mobile terminal 50 through a U-link (not shown), processes the received data according to the program loaded from the call manager 109 and transmits the processed data to the IP network 131 through the Ethernet interface and the LAN cable. The alarm information is also transmitted to the call manager 109 through the Ethernet interface and the LAN cable. Having the Internet interface 233, the private base station controller 203 can serve as the interworking function, contributing to a decrease in the hardware complexity. That is, the private base station controller 203 receives data of radio terminal 50 in an HDLC format via repeater 206→private BTS 205→LIEA 235→HINA 234 by the INIA 233, without the interworking function of a conventional system, and directly transmits the data to IP network 131 via router and LAN switch 207.

Figure 3:
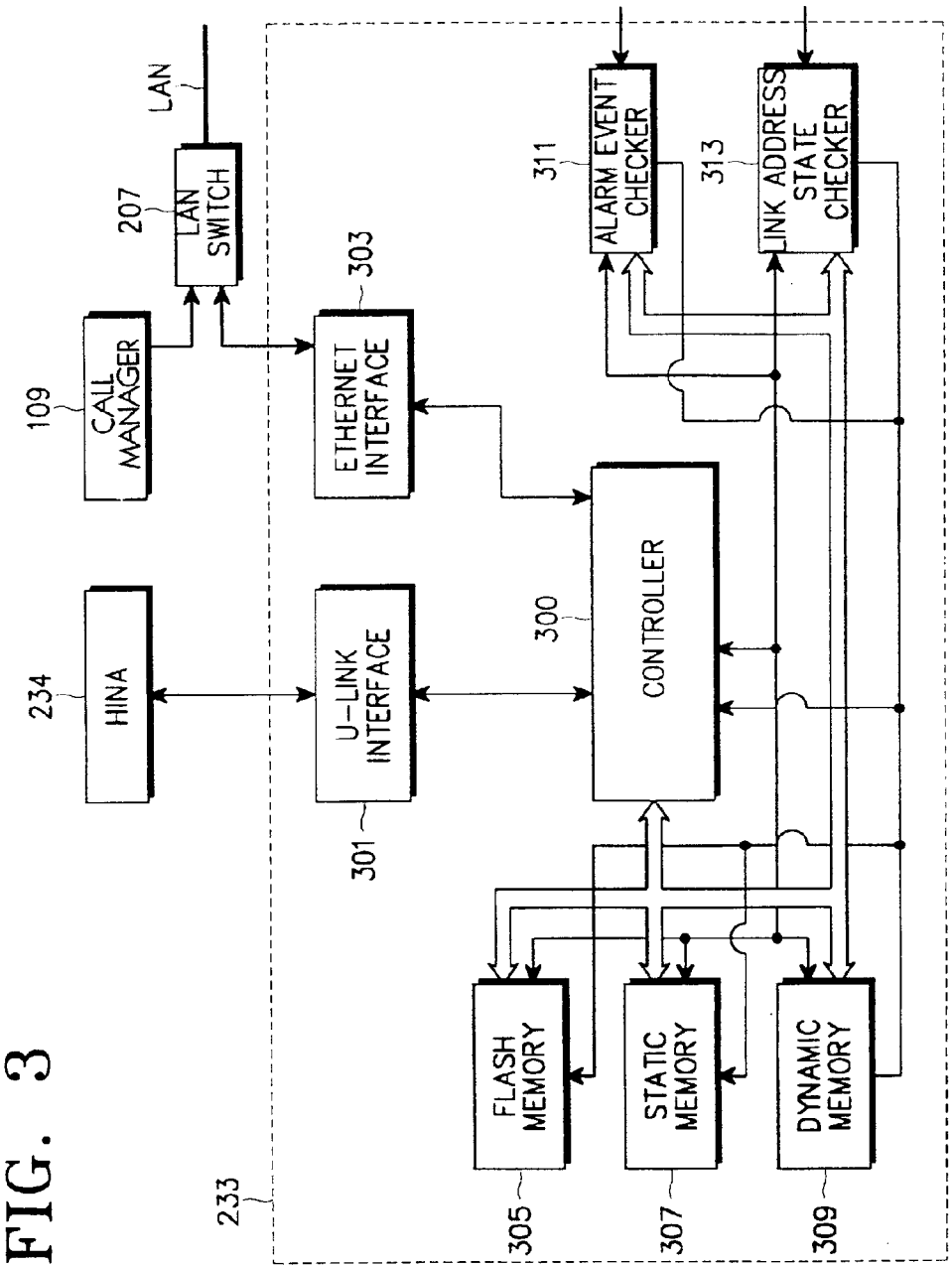
FIG. 3 is a detailed block diagram of the Internet interface shown in FIG. 2.

FIG. 3 illustrates the detailed structure of the Internet interface 233 shown in FIG. 2. Referring to FIG. 3, an alarm event checker 311 checks functional errors of various events and stores the corresponding information. A link address state checker 313 checks a link address state value of each board and stores the corresponding information. Link address state checker 313 reads the self-address for communicating INIA 233 with HINA 234. A flash memory 305 stores operating and control program data according to the radio data service and the alarm function. A static memory 307 stores various statistical data. A dynamic memory 309 temporarily stores the program data of the flash memory 305 and corresponding operation data. A U-link interface 301 is connected to the high capacity IPC node board assembly 234 and interfaces the U-link.

An Ethernet interface 303 is connected to the LAN switch 207 and interfaces the Ethernet. A controller 300 reads values of the alarm event checker 311 and the link address state checker 313, and transmits the read values to the call manager 109 through the Ethernet interface 303 and the LAN switch 207. The controller 300 reads the control program data for radio data transmission, stored in the call manager 109, and stores the read control program data in the flash memory 305.

During operation, the controller 300 transfers the control program data to a working memory area, processes the control program data when there is data to be transmitted to the mobile terminal 50 through the U-link interface 301, and transmits the processed data to the IP network 131 through the Ethernet interface 303 and the LAN switch 207.

Figure 4:
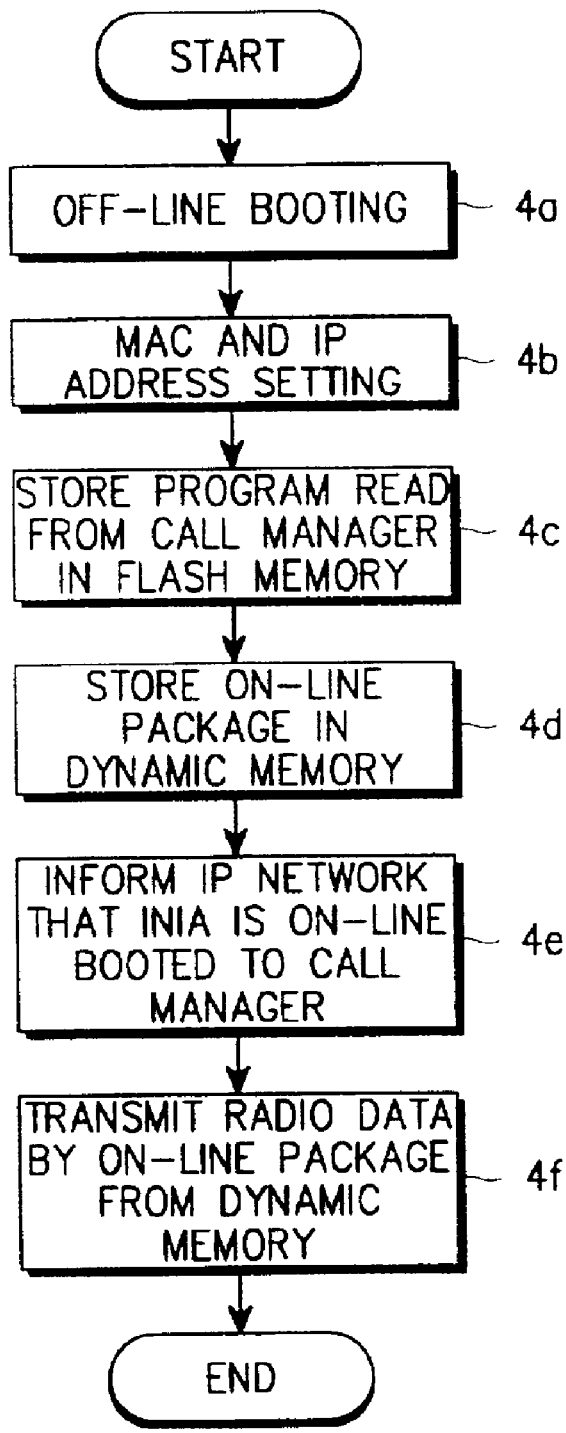
FIG. 4 is a flow chart illustrating a procedure for processing radio data according to an embodiment of the present invention.

FIG. 4 illustrates a procedure for processing the radio data according to an embodiment of the present invention.

A detailed description of the preferred embodiment will be made below with reference to FIGS. 3 and 4. The controller 300 of the Internet interface 233 performs off-line booting (a state until before initializing a CPU and all peripheral devices, and the time that an on-line program capable of performing all functions of the board is required) by a booting ROM (Read Only Memory) in step 4a. The controller 300 sets a MAC (Medium Access Control) & IP address through an RS-232C interface in the Ethernet interface 303 in step 4b. Thereafter, in step 4c, the controller 300 downloads the program from the call manager 109 through the LAN switch 207 and the Ethernet interface 303, and stores the downloaded program in the flash memory 305. In step 4d, the controller 300 on-line stores (to receive a program from a call manager during on-line and to store the received program in a flash memory; on-line means a state that a board is normally alive) the on-line package (a program, kept in a call manager and is downloaded to the board, that a board can perform all functions such as an Internet service), stored in the flash memory 305, in the dynamic memory 309 to on-line boot (a state capable of initializing a CPU and all peripheral devices and performing all functions such an Internet service) the Internet interface 233 to the call manager 109. In step 4e, the controller 300 informs the IP network 131 that the Internet interface 233 is on-line booted to the call manager 109. Then, in step 4f, the controller 300 of the Internet interface 233 transmits the radio data of the mobile terminal 50 received from the U-link interface 301, by the program, i.e., the on-line package, from the dynamic memory 309.

As described above, the Internet interface included in the private base station controller receives data from the radio terminal through the U-link interface, processes the received data according to the program loaded from the call manager, and transmits the processed data to the IP network through the Ethernet interface and the LAN cable. Therefore, even though the interworking function is removed, it is possible to control the data service of the radio mobile station in the base station controller, thereby contributing to reduction in the hardware complexity and the cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A radio data communication system including a router and LAN (Local Area Network) switch connected to an IP (Internet Protocol) network, said radio data communication system comprising:

a private base station transceiver subsystem for exchanging data with a mobile terminal;

a private IP exchange for performing switching between mobile terminals;

a call manager for managing a call; and a private base station controller for providing a mobile subscriber with a complete path and assigning a vocoder in response to a request for an incoming or outgoing call to process the incoming or outgoing call, the private base station controller comprising:

a high capacity IPC (Inter-Processor Communication) node board assembly; and an Internet interface connected between the high capacity IPC node board assembly and a LAN cable, wherein the Internet interface communicates with the private base station transceiver subsystem under the control of the call manager, transmits packet data received from the mobile terminal to the IP network, monitors installation or uninstallation and functional errors of the private IP exchange, and transmits monitoring results to a wire system manager in the call manager through an Ethernet port.

2. The radio data communication system as claimed in claim 1, wherein the Internet interface comprises:

an alarm event checker for checking functional errors of various events and storing the corresponding information;

a link address state checker for checking a link address state value of each board and storing the corresponding information;

a flash memory for storing operating and control program data according to a radio data service and an alarm function;

a static memory for storing various statistical data;

a dynamic memory for temporarily storing the program data of the flash memory and corresponding operation data;

a U-link interface connected to the high capacity IPC node board assembly, for interfacing a U-link;

an Ethernet interface connected to the LAN switch, for interfacing the Ethernet port; and a controller for reading values of the alarm event checker and the link address state checker, transmitting the read values to the call manager through the Ethernet interface and the LAN switch, reading the control program data for radio data transmission, stored in the call manager, storing the read control program data in the flash memory, transferring the control program data to a working memory area, processing the control program data when there is data to be transmitted to the mobile terminal through the U-link interface, and transmitting the processed data to the IP network through the Ethernet interface and the LAN switch.

3. A method for communicating radio data in a radio data communication system including a router and LAN (Local Area Network) switch connected to an IP (Internet Protocol) network, a private base station transceiver subsystem for exchanging data with a mobile terminal, and a private IP exchange for performing switching between mobile terminals, a call manager for managing a call, and a private base station controller for providing a mobile subscriber with a complete path and assigning a vocoder in response to a request for an incoming or outgoing call to process the incoming or outgoing call, the method comprising the steps of:

performing off-line booting by a booting ROM (Read Only Memory) in an Internet interface included in the private base station controller;

setting a medium access control and IP address, downloading a program from the call manager and storing the downloaded program in a first memory;

on-line booting an on-line package stored in the first memory to a second memory; and informing the IP network that the call manager is on-line booted, and transmitting the radio data of the mobile terminal, received by the on-line package.

4. The method as set forth in claim 3, wherein said transmitting the radio data of the mobile terminal comprises steps of:

providing the radio data from the radio terminal through a U-link interface to a controller included in said Internet interface;

processes the radio data according to the program loaded from the call manager; and transmitting the processed data to the IP network through an Ethernet interface and the LAN switch.

5. The method as set forth in claim 4, further comprising steps of:

checking functional errors of various events and storing the corresponding information; and checking a link address state value of a high capacity IPC (Inter-Processor Communication) node board assembly and an Internet interface and storing the corresponding information.

6. The radio data communication system as claimed in claim 1, wherein the Internet interface comprises:

a controller for reading operating and control program data for radio data transmission, stored in the call manager, storing the read operating and control program data in a flash memory, transferring the operating and control program data to a working memory area, processing the operating and control program data when there is data to be transmitted to the mobile terminal through a U-link interface, and transmitting the processed data to the IP network through an Ethernet interface and the LAN switch.

7. The radio data communication system as claimed in claim 1, wherein the Internet interface further comprises:

an alarm event checker for checking functional errors of various events and storing the corresponding information;

a link address state checker for checking a link address state value of each board and storing the corresponding information;

a flash memory for storing said operating and control program data according to a radio data service and an alarm function; and a dynamic memory for temporarily storing the operating and control program data of the flash memory and corresponding operation data.

8. The radio data communication system as claimed in claim 1, wherein the U-link interface is connected to the high capacity IPC node board assembly, for interfacing a U-link, and the Ethernet interface is connected to the LAN switch, for interfacing the Ethernet port.

* * * * *